United States Patent
Ranold

(10) Patent No.: US 6,810,369 B1
(45) Date of Patent: Oct. 26, 2004

(54) METHOD FOR THE COMPUTER-ASSISTED PRODUCTION OF A MACHINE WITH GEOMETRICALLY-PREDETERMINED SPHERICAL COMPONENTS

(75) Inventor: Michael Ranold, Neckarsteinach-Grein (DE)

(73) Assignee: Treuhandbüro Dr. Ottiker + Partner AG, Zürich (CH)

( * ) Notice: Subject to any disclaimer, the term of this patent is extended or adjusted under 35 U.S.C. 154(b) by 0 days.

(21) Appl. No.: 09/720,741
(22) PCT Filed: Jul. 3, 1998
(86) PCT No.: PCT/EP98/04110
§ 371 (c)(1),
(2), (4) Date: Dec. 29, 2000
(87) PCT Pub. No.: WO00/02163
PCT Pub. Date: Jan. 13, 2000

(51) Int. Cl.[7] ................................. G06F 7/60
(52) U.S. Cl. .................... 703/2; 700/98; 700/118; 700/159; 700/163; 700/182; 345/420
(58) Field of Search ................ 92/12.2, 71, 57; 91/491, 499, 505; 74/60; 417/269, 464; 425/444, 556; 510/298, 446; 703/1, 2; 700/96–98, 117, 118, 159, 163, 30, 182; 345/419, 420

(56) References Cited

U.S. PATENT DOCUMENTS

| | | | |
|---|---|---|---|
| 4,797,842 A | * | 1/1989 | Nackman et al. ............. 716/20 |
| 4,995,716 A | * | 2/1991 | Warnicki et al. ............. 351/212 |
| 5,511,414 A | | 4/1996 | Nakamura et al. |
| 5,557,714 A | * | 9/1996 | Lines et al. .................. 345/653 |
| 6,044,306 A | * | 3/2000 | Shapiro et al. ............... 700/90 |
| 6,245,274 B1 | * | 6/2001 | Huybrechts et al. ......... 264/257 |

FOREIGN PATENT DOCUMENTS

| | | | | |
|---|---|---|---|---|
| DE | | 19752890 A1 | * 7/1998 | ........... F16H/55/02 |
| EP | | 0 389 890 A3 | 10/1990 | |
| EP | | 0 898 247 A2 | * 2/1999 | ........... G06T/17/30 |
| WO | WO 95 00 916 | | 1/1995 | |

OTHER PUBLICATIONS

Dutta D et al: "Cyclides in surface and solid modeling" IEEE Computer Graphics and Applications, Jan. 1993, USA vol. 13, No. 1, p. 53–59, XP002098389 ISSN 0272-1716.

Brandner, G: "Dreh– Und Schraubenflächen Als Mögliche Walelz–Teil– Und Flakenflächen Räumlicher Verzahnungen" Maschinenbautechnik, Berlin 32, No. 12, 1983, pp. 559–563, XP002098390.

* cited by examiner

Primary Examiner—Anthony Knight
Assistant Examiner—Crystal J. Barnes
(74) Attorney, Agent, or Firm—Paul Vincent

(57) ABSTRACT

The invention relates to a method for producing, in a computer-assisted way, a machine having pairs of geometrically-predetermined spherical components, i.e. a component B with recesses and a component W with bumps. According to said process, a spherical shell model is used to described mathematically the geometry of the vaulted surfaces formed by the recesses and the bumps of component W and component B.

10 Claims, 6 Drawing Sheets

Model data

Elevations: 4
Waves: 3
Elements: 72
Shells: 2
External radius: $R_{out}$ = 100mm
Inner radius: $R_{in}$ = 20mm
Radius of elevation tip: $r = 25 \times \frac{R}{R_{out}}$ [mm]

Angle of axis: $\Phi = 0.2$ [radians]
Angle of elevation: $\gamma = 0.2$ [radians]
Offset angle: $\delta = 0$ Model data Elevations: 4
Waves: 3
Elements: 72
Shells: 5
External radius: $R_{out}$ = 100mm
Inner radius: $R_{in}$ = 20mm
Radius of elevation tip: $r = -6.666667 + 50 \times \dfrac{R}{R_{out}}[\text{mm}] - 33.333333 \times \dfrac{R^2}{R_{out}}[\text{mm}]$ Angle of axis: $\Phi$ = 0.2 [radians]
Angle of elevation: $\gamma$ = 0.2 [radians]
Offset angle: $\delta$ = 0 [radians]

Model data

Elevations: 4
Waves: 3
Elements: 72
Shells: 5
External radius: $R_{out}$ = 100mm
Inner radius: $R_{in}$ = 20mm
Radius of elevation tip: $r = 10 \times \dfrac{R}{R_{out}}$ [mm]

Angle of axis: $\Phi = 0.2$ [radians]
Angle of elevation: $\gamma = -0.1 + 1.7 \times \dfrac{R}{R_{out}} - 1 \ast \times \dfrac{R^2}{R_{out}}$ [mm]

Offset angle: $\delta = 0$ [radians]

Model data

```
Elevations:        4
Waves:             3
Elements:         72
Shells:           10
```
External radius: $R_{out}$ = 100mm
Inner radius: $R_{in}$ = 20mm
Radius of elevation tip: $r = 10 \times \frac{R}{R_{out}}$ [mm]

Angle of axis: $\Phi = 0.2$ [radians]
Angle of elevation: $\gamma = 0.2$ [radians]
Offset angle: $\delta = 0.2 + 1 \times \frac{R}{R_{out}}$ [radians]

METHOD FOR THE COMPUTER-ASSISTED PRODUCTION OF A MACHINE WITH GEOMETRICALLY-PREDETERMINED SPHERICAL COMPONENTS

BACKGROUND OF THE INVENTION

The invention concerns a method for computer-assisted production of a machine having geometrically predetermined spherical components.

Methods and devices for computer-assisted construction of machines (piston machines, compressors, pumps or the like) are known which permit engineers virtual examination of the properties of existing structures. The aim of such examinations is to optimize the machines in accordance with the constructional demands. Optimization is thereby limited by the basic operational principle (piston machine, screw compressor, rotating piston compressor, geared pump etc.). If the optimized design of the produced machine does not meet the requirements, it is up to the creativity of the engineer to produce a new constructive solution assisted by construction, visualization and simulation methods. He can thereby select one of several machines which operate according to different operational principles (e.g. piston machine or fluid flow machine) or optimize the parameters of a constructive embodiment of the machine within the limits of a particular operational principle (e.g. stroke limitation of piston machines). Existing methods for computer-assisted production of machines require the user to have a preconception of the geometry of the components of a machine which are to be produced. Spatial definition and precise representation e.g. of rotational piston machines with angular or inclined axes is not assisted by the methods known up to now (CAD, CAE).

SUMMARY OF THE INVENTION

In contrast thereto, the method in accordance with the invention has the advantage that the representation and complete spatial definition of the machines having pairs of geometrically predetermined spherical components and the spatial engagement of its components becomes possible. The user thereby specifies a set of constant and variable parameters and obtains the geometric construction data for a machine having a matched component pair, whose two components W and B spatially engage one another and form oscillating working regions.

In accordance with an advantageous embodiment of the invention, the coordinates of the curved surfaces of the components W and B are determined through variation of the sphere radius R on several different spherical shells thereby defining the complex, spherical surfaces of the components W and B via an envelope of points.

According to a further advantageous embodiment of the invention each spherical shell is rotated with respect to the previous spherical shell by an angle of rotation $\delta$ to generate spiralling spherical surface geometries of the components B and W.

In accordance with a further advantageous embodiment of the invention, the coordinate systems for calculating and describing the curved surfaces of the components B and W are right-hand Cartesian coordinate systems.

In accordance with a further advantageous embodiment of the invention, the calculated values of the surface geometry of component B and component W are used for controlling a machine tool. The engineer can thereby virtually examine a larger number of variations of the machine to be produced with respect to its properties and optimize same according to the demands on the machine before the final form of the machine can be determined. The construction parameters obtained thereby may be further used directly for controlling a machine tool.

A further advantageous embodiment of the invention uses the method for systematic classification of machines having pairs of geometrically predetermined spherical components, wherein machines with similar parameters and properties are combined into groups and classes. Such a classification facilitates not only definition of already calculated machines but can also give information for fixing the parameters for a machine to be produced.

Further advantages and advantageous embodiments of the invention can be extracted from the following description of an example, the drawing and the claims.

Further model examples and one embodiment of the subject matter of the invention are shown in the drawing and described in more detail below.

DESCRIPTION OF THE PREFERRED EMBODIMENT

Figure 1:
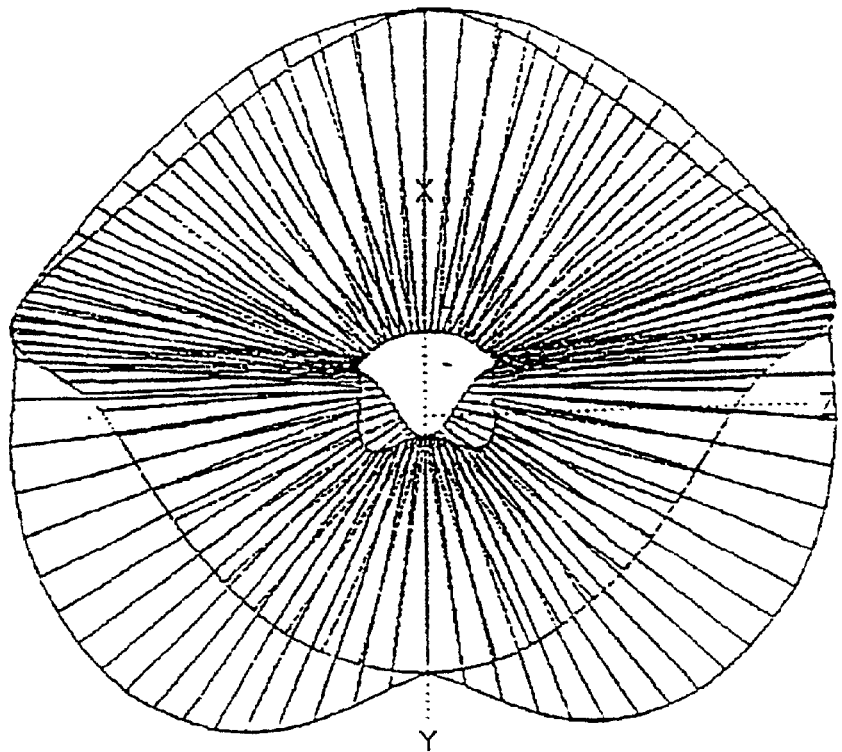
FIG. 1 shows an example of a simple model.

The models shown in FIGS. 1 through 4 are all based on the following model calculation, by changing the variable parameters. FIG. 5 shows a component pair of a machine having geometrically predetermined spherical components produced in accordance with the inventive method.

Mathematical Model Calculation

The following parameters may be variably predetermined:

Number of elevations of component B: zb
Number of depressions of component W: zw=zb−1
Rotational angle of component B: $\Theta$
Rotational angle of component W: $\eta$
Axial angle between A1 and A2: $\Phi$
Elevation angle: $\gamma$
Rolling radius: r
Sphere radius: R
Offset angle: $\delta$ Calculation of the construction details for component W:

The initial equation (1) describes the coordinates of an intersecting circle lying on the surface of a sphere having a radius R as initial element K, wherein the origin of the intersecting circle coincides with the origin of the coordinate system of equation (1). In the x-z plane with angle $\alpha$ relative to the x axis:

$$\vec{r} = r \times \begin{pmatrix} \cos\alpha \\ 0 \\ \sin\alpha \end{pmatrix} \quad (1)$$

The origin of the intersecting circle coordinate system is displaced into the center of the sphere (displacement vector V):

$$V = \sqrt{R^2 - r^2} \quad (2)$$

$$\vec{r} = \begin{pmatrix} r \times \cos\alpha \\ V \\ r \times \sin\alpha \end{pmatrix} \quad (3)$$

At first, rotation into a body-fixed W coordinate system about the z axis is effected:

$$\vec{r} = \begin{pmatrix} \cos\gamma & \sin\gamma & 0 \\ -\sin\gamma & \cos\gamma & 0 \\ 0 & 0 & 1 \end{pmatrix} \times \begin{pmatrix} r \times \cos\alpha \\ V \\ r \times \sin\alpha \end{pmatrix} \quad (4)$$

$$\vec{r} = \begin{pmatrix} r \times \cos\gamma \times \cos\alpha + V \times \sin\gamma \\ -r \times \sin\gamma \times \cos\alpha + V \times \cos\gamma \\ r \times \sin\alpha \end{pmatrix} \quad (5)$$

followed by rotation about the x axis with rotational angle $\Theta$ in a mathematically positive direction:

$$\vec{r} = \begin{pmatrix} 1 & 0 & 0 \\ 0 & \cos\Theta & \sin\Theta \\ 0 & -\sin\Theta & \cos\Theta \end{pmatrix} \times \begin{pmatrix} r \times \cos\gamma \times \cos\alpha + V \times \sin\gamma \\ -r \times \sin\gamma \times \cos\alpha + V \times \cos\gamma \\ r \times \sin\alpha \end{pmatrix} \quad (6)$$

$$\vec{r} = \begin{pmatrix} r \times \cos\gamma \times \cos\alpha + V \times \sin\gamma \\ \cos\Theta \times (-r \times \sin\gamma \times \cos\alpha + V \times \cos\gamma) + r \times \sin\Theta \times \sin\alpha \\ -\sin\Theta \times (-r \times \sin\gamma \times \cos\alpha + V \times \cos\gamma) + r \times \cos\Theta \times \sin\alpha \end{pmatrix} \quad (7)$$

Subsequent rotation about the z axis with rotational angle $\phi$ in a mathematically positive direction results in:

$$\vec{r} = \begin{pmatrix} \cos\Phi & -\sin\Phi & 0 \\ \sin\Phi & \cos\Phi & 0 \\ 0 & 0 & 1 \end{pmatrix} \times \begin{pmatrix} r \times \cos\gamma \times \cos\alpha + V \times \sin\gamma \\ \cos\Theta \times (-r \times \sin\gamma \times \cos\alpha + V \times \cos\gamma) + r \times \sin\Theta \times \sin\alpha \\ -\sin\Theta \times (-r \times \sin\gamma \times \cos\alpha + V \times \cos\gamma) + r \times \cos\Theta \times \sin\alpha \end{pmatrix} \quad (8)$$

$$= \begin{pmatrix} \cos\Phi \times \{r \times \cos\gamma \times \cos\alpha + V \times \sin\gamma\} - \sin\Phi \times \{\cos\Theta \times \\ (-r \times \sin\gamma \times \cos\alpha + V \times \cos\gamma) + r \times \sin\Theta \times \sin\alpha\} \\ \sin\Phi \times \{r \times \cos\gamma \times \cos\alpha + V \times \sin\gamma\} + \cos\Phi \times \{\cos\Theta \times \\ (-r \times \sin\gamma \times \cos\alpha + V \times \cos\gamma) + r \times \sin\Theta \times \sin\alpha\} \\ -\sin\Theta \times (-r \times \sin\gamma \times \cos\alpha + V \times \cos\gamma) + r \times \cos\Theta \times \sin\alpha \end{pmatrix} \quad (9)$$

Rotation about the x axis with generating angle $\eta$ in a mathematically negative direction gives the coordinates of the development of the intersecting circle K in the body-fixed W coordinate system:

$$\vec{r} = \begin{pmatrix} 1 & 0 & 0 \\ 0 & \cos\eta & -\sin\eta \\ 0 & \sin\eta & \cos\eta \end{pmatrix} \times \begin{pmatrix} \cos\Phi \times [r \times \cos\gamma \times \cos\alpha + V \times \sin\gamma] - \sin\Phi \times \\ [\cos\Theta \times (-r \times \sin\gamma \times \cos\alpha + V \times \cos\gamma) + r \times \sin\Theta \times \sin\alpha] \\ \sin\Phi \times [r \times \cos\gamma \times \cos\alpha + V \times \sin\gamma] + \cos\Phi \times \\ [\cos\Theta \times (-r \times \sin\gamma \times \cos\alpha + V \times \cos\gamma) + r \times \sin\Theta \times \sin\alpha] \\ -\sin\Theta \times (-r \times \sin\gamma \times \cos\alpha + V \times \cos\gamma) + r \times \cos\Theta \times \sin\alpha \end{pmatrix} \quad (10)$$

$$= \begin{pmatrix} \cos\Phi \times [r \times \cos\gamma \times \cos\alpha + V \times \sin\gamma] - \sin\Phi \times \\ [\cos\theta \times (-r \times \sin\gamma \times \cos\alpha + V \times \cos\gamma) + r \times \sin\theta \times \sin\alpha] \\ \cos\eta \times \{\sin\Phi \times [r \times \cos\gamma \times \cos\alpha + V \times \sin\gamma] + \cos\Phi \times \\ [\cos\theta \times (-r \times \sin\gamma \times \cos\alpha + V \times \cos\gamma) + r \times \sin\theta \times \sin\alpha]\} - \\ \sin\eta \times \{-\sin\theta \times (-r \times \sin\gamma \cos\alpha + V \times \cos\gamma + r \times \cos\theta \times \sin\alpha\} \\ \sin\eta \times \{\sin\Phi \times [r \times \cos\gamma \times \cos\alpha + V \times \sin\gamma] + \cos\Phi \times \\ [\cos\theta \times (-r \times \sin\gamma \times \cos\alpha + V \times \cos\gamma) + r \times \sin\theta \times \sin\alpha]\} + \\ \cos\eta \times \{-\sin\theta \times (-r \times \sin\gamma \times \cos\alpha + V \times \cos\gamma) + r \times \cos\theta \times \sin\alpha\} \end{pmatrix} \quad (11)$$

The angle $\alpha$ is calculated for equation (11). For the tangent of the circle origin development (intersecting circle K) a vector is formed between a center before and a center after the actual circle origin. The vector from the circle origin to a point on the circle should be perpendicular to this vector. The vector product gives equation (12).

$$A \times \tan\alpha + B = 0 \quad (12)$$

With
$\Theta P = \Theta$ of the next circle origin
$\Theta M = \Theta$ of the previous circle origin
$\eta P = \eta$ of the next circle origin
$\eta M = \eta$ of the previous circle origin and $A = (\cos \Theta P - \cos \Theta M) \times \sin^2 \phi \cos \gamma \times$ $\sin \theta + (\cos \eta \times \cos \phi \times \sin \theta - \sin \eta \times \cos\theta) \times$ $[(\cos \eta P - \cos \eta M) \times \sin \phi \times \sin \gamma$ $+ (\cos \eta P \times \cos \theta P - \cos \eta M \times \cos \theta M) \times$ $\cos \phi \times \cos \gamma + (\sin \eta P \times \sin \theta P - \sin \eta M$ $\times \sin \theta M) \times \cos \gamma]$ $+ (\sin \eta \times \cos \phi \times \sin \theta + \cos \eta \times \cos \theta) \times$ $[(\sin \eta P - \sin \eta M) \times \sin \phi \times \sin \gamma$ $+ (\sin \eta P \times \cos \theta P - \sin \eta M$ $\times \cos \theta M) \times \cos \phi \times \cos\gamma$ $+ (\cos \eta M \times \sin \theta M - \cos \eta P$ $\times \sin \theta P) \times \cos \gamma] \quad (13)$ $B = (\cos \theta M - \cos \theta P) \times [\sin \phi$ $\times \cos \phi \times \cos^2 \gamma + \sin^2 \phi \sin \gamma$ $\times \cos \gamma \times \cos \theta] + [\cos \theta \times$ $(\sin \phi \times \cos \gamma - \cos \phi \times \cos \theta \times \sin \gamma) - \sin$ $\eta \times \sin \theta \times \sin \gamma] \times [(\cos \eta P$ $- \cos \eta M) \times \sin\phi \times \sin \gamma$ $+ (\cos \eta P \times \cos \theta P - \cos \eta M$ $\times \cos \theta M) \times \cos \phi \times \cos \gamma$ +(sin ηP×sin θP−sin ηM ×sin θM)×cos γ]+[sin η×

(sin φ×cos γ−cos φ×cos θ×sinγ)

cos η×sin θ×sin γ]×[(sin ηP

−sin ηM)×sin φ×sin γ

+(sin ηP×cos θP−sin ηM

×cos θM)×cos φ×cos γ

+(cos ηM×sin θM−cos ηP

×sin θP×cos γ]     (14)

wherein $$\alpha = \arctan(-B/A) \qquad (15)$$

To obtain the construction coordinates of component W, the angle α is calculated for Θ from zero to 360 degrees, and inserted in equation (11) with the corresponding η. Construction requirements for component B:

Component B is obtained by ensuring free movement of component W which is possible by back transformation of the obtained points of component W in a B-stationary coordinate system. Components W and B are rotated such that all points in the projection on the y-z plane of the body-fixed B coordinate system assume the same angle about the y or z axis. The point with the smallest x value is an element of the envelope curve (component B). The individual points of component W are transformed back with $$\vec{PB} = \begin{pmatrix} \cos\Phi & \sin\Phi \times \cos\eta & \sin\Phi \times \sin\eta \\ -\cos\Theta \times \sin\Phi & \cos\Theta \times \cos\eta \times \cos\Phi + \sin\Theta \times \sin\eta & \cos\Theta \times \sin\eta \times \cos\Phi - \sin\Theta \times \cos\eta \\ -\sin\Theta \times \sin\Phi & -\cos\Theta \times \sin\eta + \sin\Theta \times \cos\eta \times \cos\Phi & \cos\Theta \times \cos\eta + \sin\Theta \times \sin\eta \times \cos\Phi \end{pmatrix} \times \vec{PW} \qquad (16)$$

FIGS. 1 through 4 show examples of geometrically pre-determined spherical component pairs according to the above-described model calculation. FIG. 1 shows a simple model having the following parameters:
Elevations: 4
Waves: 3
Elements: 72
Shells: 2
External radius: $R_{out}$=100 mm
Inner radius: $R_{in}$=20 mm
Radius of elevation tip:

$$r = 25 \times \frac{R}{R_{out}} \quad [mm]$$

Angle of axis: φ=0.2 [radians]
Angle of elevation: γ=0.2 [radians]
Offset angle: δ=0

Figure 2:
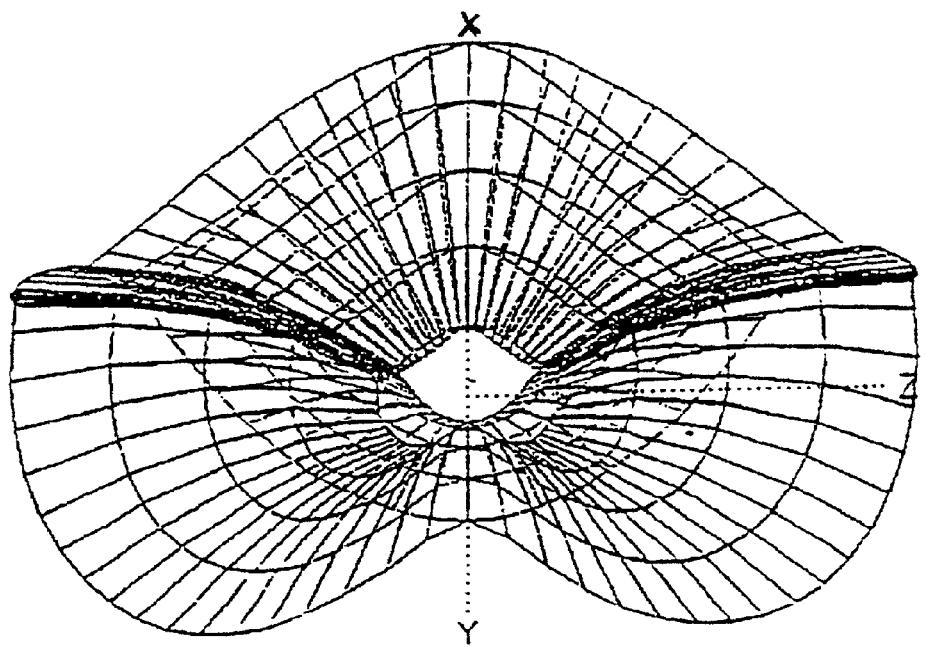
FIG. 2 shows an example of a model with variable rolling radius r.

FIG. 2 shows an example of a model with variable rolling radius r and was calculated with the following parameters:
Elevations: 4
Waves: 3
Elements: 72
Shells: 5
External radius: $R_{out}$=100 mm
Inner radius: $R_{in}$=20 mm Radius of elevation tip:

$$r = -6.666667 - 50 \times \frac{R}{R_{out}} \quad [mm] - 33.333333 \times \frac{R^2}{R_{out}} \quad [mm]$$

Angle of axis: φ=0.2 [radians]
Angle of elevation: γ=0.2 [radians]
Offset angle: δ=0 [radians]

Figure 3:
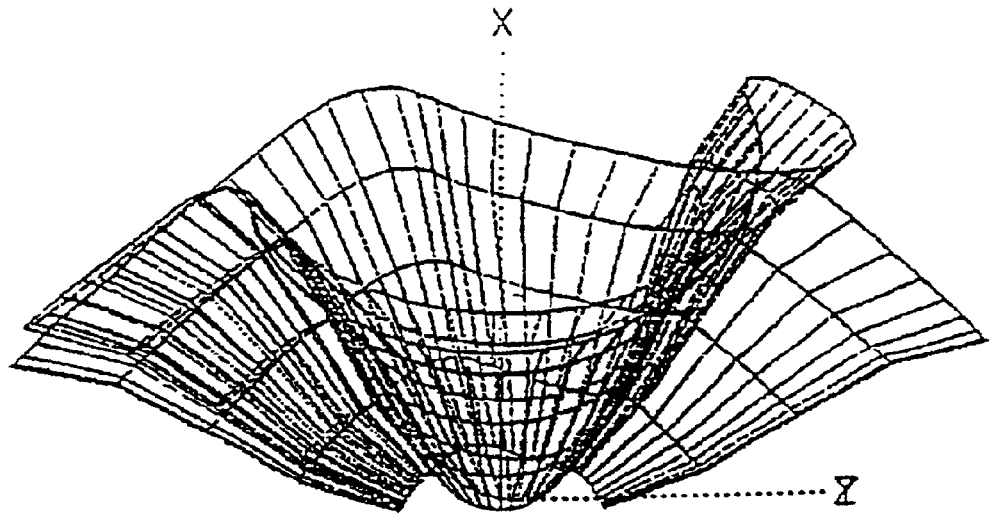
FIG. 3 shows an example of a model with variable elevation angle $\gamma$.

In the model of FIG. 3 the elevation angle γ was varied and the following parameter values were used:
Elevations: 4
Waves: 3
Elements: 72
Shells: 5
External radius: $R_{out}$=100 mm
Inner radius: $R_{in}$=20 mm
Radius of elevation tip:

$$r = 10 \times \frac{R}{R_{out}} \quad [mm]$$

Angle of axis: φ=0.2 [radians]
Angle of elevation:

$$\gamma = -0.1 + 1.7 \times \frac{R}{R_{out}} - 1 * \times \frac{R^2}{R_{out}} \quad [mm]$$

Offset angle: δ=0 [radians]

Figure 4:
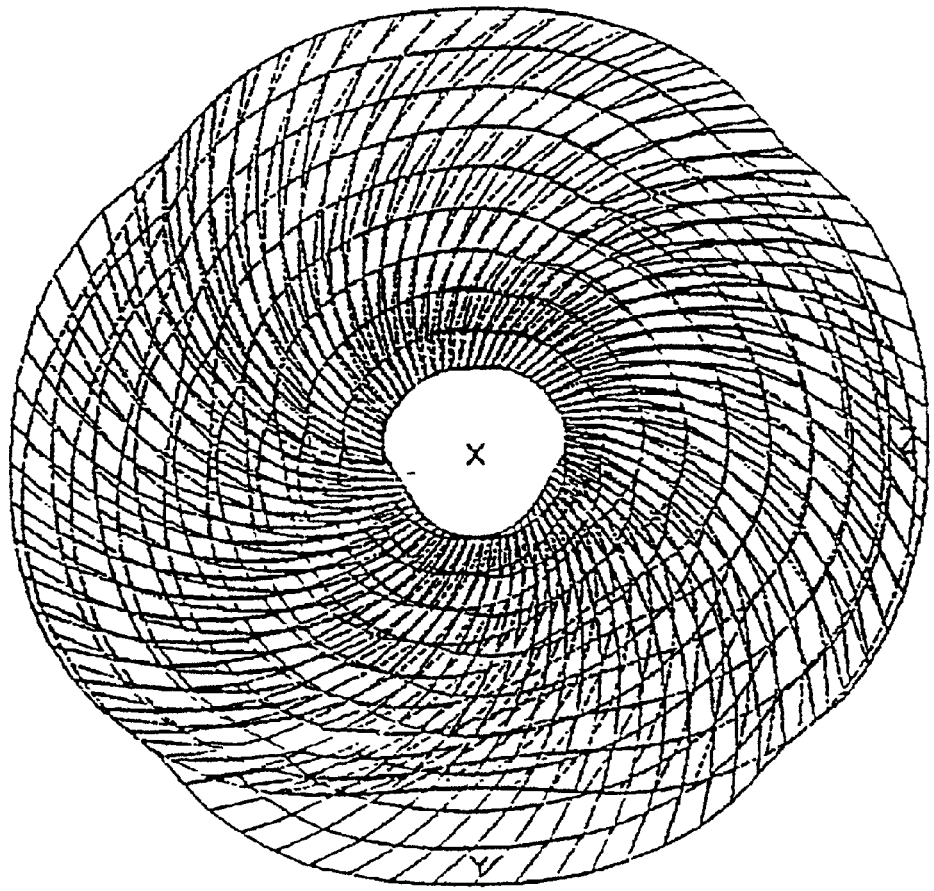
FIG. 4 shows an example of a rotated model.
Figure 5:
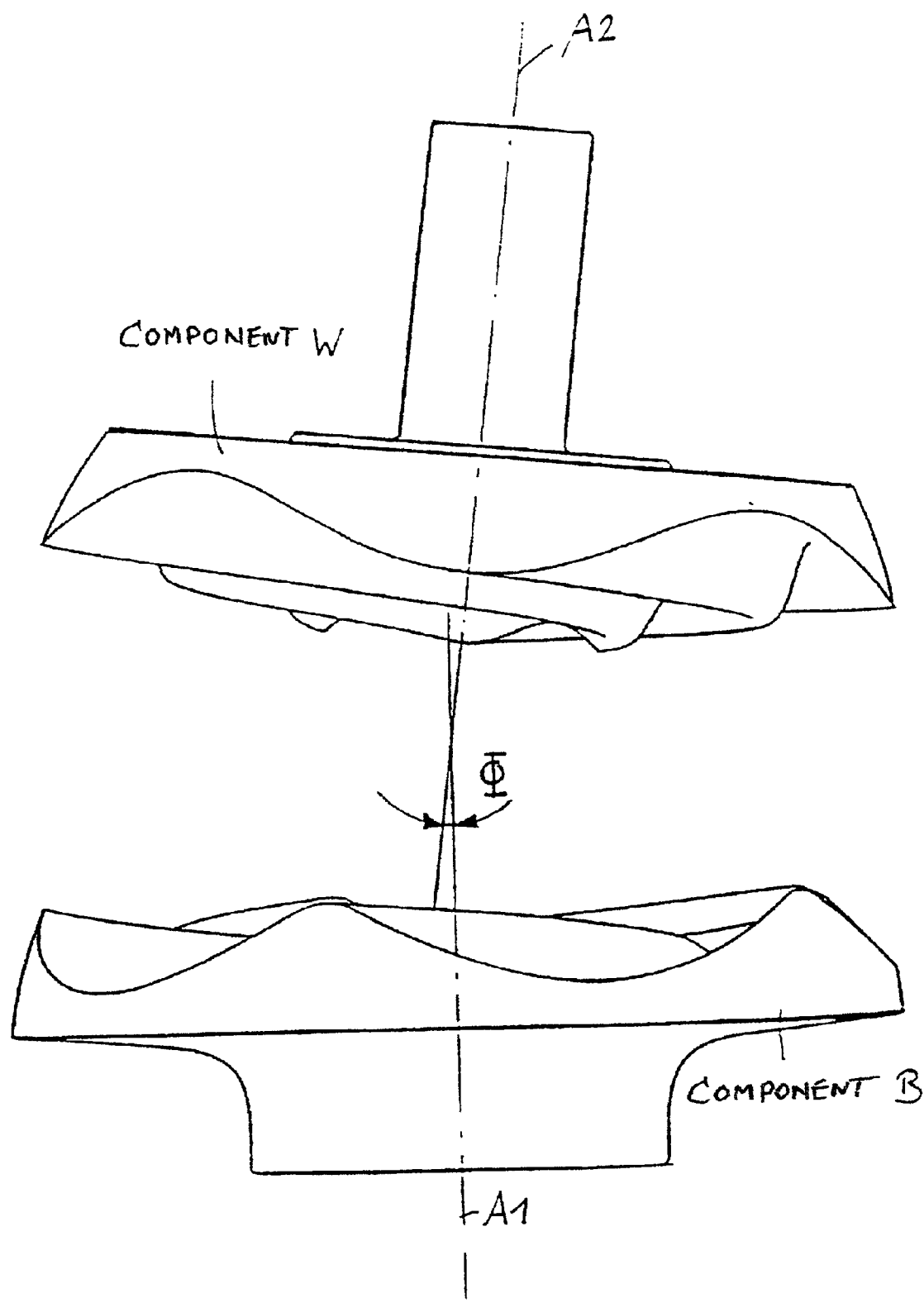
FIG. 5 shows an example of a machine having geometrically predetermined spherical components.

FIG. 4 shows a model with an offset angle other than zero whereby the elevations and depressions of component B or component W are spiralled. The following parameters were used:
Elevations: 4
Waves: 3
Elements: 72
Shells: 10
External radius: $R_{out}$=100 mm
Inner radius: $R_{in}$=20 mm
Radius of elevation tip:

$$r = 10 \times \frac{R}{R_{out}} \quad [mm]$$

Angle of axis: φ=0.2 [radians]
Angle of elevation: γ=0.2 [radians]
Offset angle:

$$\delta = 0.2 + 1 \times \frac{R}{R_{out}} \quad [radians]$$

The components B and w shown in FIG. 5 have spiral elevations or depressions. The axes A2 and A1 which are rotational axes of component W and component B have an axis ratio of φ.

Figure 6:
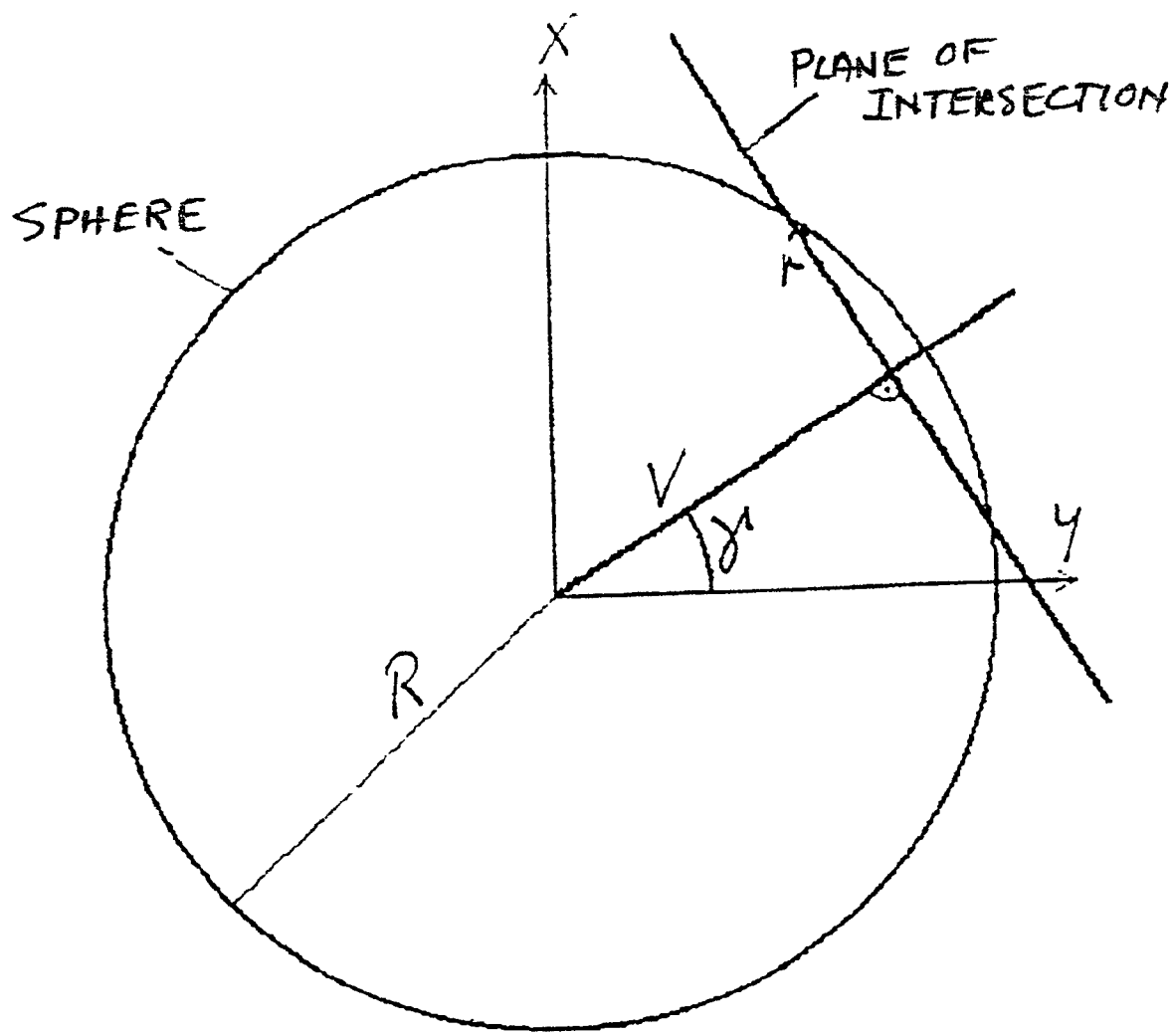
FIG. 6 shows a schematic representation of the rolling development of the intersecting circle on the sphere.

FIG. 6 schematically shows the development of the intersecting circle lying in the plane of intersection of the sphere schematically showing rolling radius r. V is the displacement vector of the displacement of the coordinate system origin from the center of the intersecting circle in the center of the sphere having the radius R. The elevation angle between the displacement vector V and the y axis of the coordinate system is γ.

All the features shown in the description, the following claims and the drawing can be important to the invention either individually or collectively in any arbitrary combination.

I claim:

1. A method for computer-assisted production of a machine having pairs of geometrically predetermined spherical components, the machine having a component W with depressions and a component B having elevations, wherein the component W has a body-fixed W coordinate system and one axis of the W coordinate system coincides with a rotational axis A2 of component W, and wherein component B has a body-fixed B coordinate system and one axis of the B coordinate system coincides with a rotational axis A1 of component B, and with a constant axial angle Θ between the rotational axes A1 and A2, wherein there are a fixed number of elevations zb of component B and a fixed number of depressions zw of component W, with the number of depressions zw being larger or smaller by one than the number of elevations zb, and with a predetermined rotational angle Θ of component B and a predetermined rotational angle η of component W with a rotational angle ratio of i (i=η/Θ=zb/zw), wherein a spherical shell model is used for mathematical geometrical description of curved surfaces produced by the depressions and elevations of component W or component B, the model utilizing at least one sphere having a radius R and with an initial element K, which is preferably a circle intersecting the sphere and having a radius r, the method comprising the steps of:

a) calculating coordinates of points on the sphere of the initial element K in an initial element coordinate system which is stationary with respect to the initial element K;

b) calculating coordinates of the initial element K in the W coordinate system through at least one transformation of the initial element coordinate system;

c) developing the initial element K on a spherical surface to determine a geometry of component W in the W coordinate system; and d) back transforming obtained points of component W into the B coordinate system through simultaneous turning of the components B and W to determine an envelope curve of points having the smallest elevation values above a plane of the B coordinate system to define a curved surface of component B.

2. The method of claim 1, further comprising calculating several spherical shells for curved surfaces of component W and component B through variation of the sphere radius R.

3. The method of claim 2, wherein each spherical shell is turned about the A1 rotational axis with respect to a previous spherical shell by an offset angle δ.

4. The method of claim 1, wherein the initial element coordinate system, the W coordinate system, and the B coordinate system are right-handed cartesian coordinate systems.

5. The method of claim 1, wherein the transformation from the initial element coordinate system to an axially stationary W coordinate system for calculation of coordinates of the development of the initial element K on the spherical surface consists of a plurality of individual transformations between cartesian coordinate systems.

6. The method of claim 5, wherein a first transformation is a displacement of a coordinate system origin from a center of the initial element K into a center of the sphere.

7. The method of claim 1, wherein all transformations, except for a first transformation, are rotations about axes.

8. The method of claim 1, wherein initial element K is an intersecting circle of the sphere and that, in step c), a tangential vector is formed between a center before and a center after an actual center of a rolling intersecting circle K, which is perpendicular to a vector between the circle origin and a contacting point of the intersecting circle K.

9. The method of claim 1, wherein calculated values of a surface geometry of component B and component W are used for controlling a machine tool.

10. The method of claim 1, wherein the method is used for systematic optimization and classification of machines having geometrically predetermined spherical component pairs.

* * * * *